(12) United States Patent
Song et al.

(10) Patent No.: US 10,726,976 B2
(45) Date of Patent: Jul. 28, 2020

(54) SEMICONDUCTIVE SHIELD FREE OF WELD LINES AND PROTRUSIONS

(71) Applicant: Dow Global Technologies LLC, Midland, MI (US)

(72) Inventors: Xiaomei Song, Shanghai (CN); Hongyu Chen, Shanghai (CN); Yabin Sun, Shanghai (CN); Youjun Wu, Shanghai (CN); Wei Li, Shanghai (CN); Xiaoxiong Miao, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/313,352

(22) PCT Filed: Jun. 30, 2016

(86) PCT No.: PCT/CN2016/087870
§ 371 (c)(1),
(2) Date: Dec. 26, 2018

(87) PCT Pub. No.: WO2018/000314
PCT Pub. Date: Jan. 4, 2018

(65) Prior Publication Data
US 2019/0156973 A1    May 23, 2019

(51) Int. Cl.
| | |
|---|---|
| *H01B 9/00* | (2006.01) |
| *H01B 9/02* | (2006.01) |
| *C08L 23/06* | (2006.01) |
| *C08L 23/08* | (2006.01) |
| *C08L 23/04* | (2006.01) |
| *C08K 3/04* | (2006.01) |
| *H01B 1/24* | (2006.01) |

(52) U.S. Cl.
CPC .............. *H01B 9/027* (2013.01); *C08K 3/04* (2013.01); *C08L 23/04* (2013.01); *C08L 23/06* (2013.01); *C08L 23/0815* (2013.01); *C08L 23/0869* (2013.01); *H01B 1/24* (2013.01); *C08L 2205/02* (2013.01)

(58) Field of Classification Search
CPC .................................. H01B 3/30; H01B 3/56
USPC .... 174/110 R–110 E, 120 R, 120 SR, 121 R, 174/121 SR
See application file for complete search history.

(56) References Cited

U.S. PATENT DOCUMENTS

| | | |
|---|---|---|
| 3,334,081 A | 8/1967 | Madgwick et al. |
| 5,246,783 A | 9/1993 | Spenadel et al. |
| 5,272,236 A | 12/1993 | Lai et al. |
| 5,278,272 A | 1/1994 | Lai et al. |
| 5,986,028 A | 11/1999 | Lai et al. |

(Continued)

FOREIGN PATENT DOCUMENTS

CN          102532635 A        7/2012

*Primary Examiner* — William H. Mayo, III
(74) *Attorney, Agent, or Firm* — Quarles & Brady LLP

(57) ABSTRACT

Semiconductive shield layers for power cable constructions are made from a composition that has: (A) A nonpolar, ethylene-based polymer having a density of greater than (>) 0.90 g/cc and a melt index of >20 g/10 min at 190° C./2.16 Kg; (B) A polar polymer consisting of ethylene and an unsaturated alkyl ester having 4 to 20 carbon atoms; (C) Acetylene carbon black; and (D) A curing agent; with the provisos that (1) the composition has a phase separated structure, and (2) the weight ratio of nonpolar polymer to polar polymer is from 0.25 to 4.

15 Claims, 1 Drawing Sheet

Representative phase separated structure of resin blend in Inventive Example 1-1~6 (pure resin blend without filling carbon black for better observation, bar: 5μm)

(56) References Cited

U.S. PATENT DOCUMENTS

| | | |
|---|---|---|
| 6,197,219 B1 | 3/2001 | Foulger |
| 6,277,303 B1 * | 8/2001 | Foulger .................. C08K 3/04 |
| | | 252/500 |
| 6,455,771 B1 | 9/2002 | Han et al. |
| 6,496,629 B2 | 12/2002 | Ma et al. |
| 6,714,707 B2 | 3/2004 | Rossi et al. |
| 7,355,089 B2 | 4/2008 | Chang et al. |
| 7,504,347 B2 | 3/2009 | Poon et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 7,732,711 B2 | 6/2010 | Ericsson et al. |
| 7,767,910 B2 | 8/2010 | Kjellqvist et al. |
| 8,124,877 B2 | 2/2012 | Broman et al. |
| 8,388,868 B2 | 3/2013 | Easter |
| 8,425,806 B2 | 4/2013 | Noyens et al. |
| 9,006,575 B2 | 4/2015 | Fagrell et al. |
| 9,064,618 B2 | 6/2015 | Kuchta et al. |
| 2008/0050588 A1 * | 2/2008 | Broman ................ C08F 210/16 |
| | | 428/375 |
| 2009/0056973 A1 * | 3/2009 | Kjellqvist ............... C08L 23/04 |
| | | 174/110 R |
| 2011/0186328 A1 * | 8/2011 | Easter ................ C08L 23/0815 |
| | | 174/102 SC |
| 2013/0168126 A1 | 7/2013 | Kuchta et al. |
| 2015/0004411 A1 | 1/2015 | Malik et al. |
| 2015/0170787 A1 * | 6/2015 | Uematsu ................ C08L 23/06 |
| | | 428/379 |
| 2015/0315401 A1 * | 11/2015 | Lee ........................ C08L 23/06 |
| | | 385/100 |

* cited by examiner

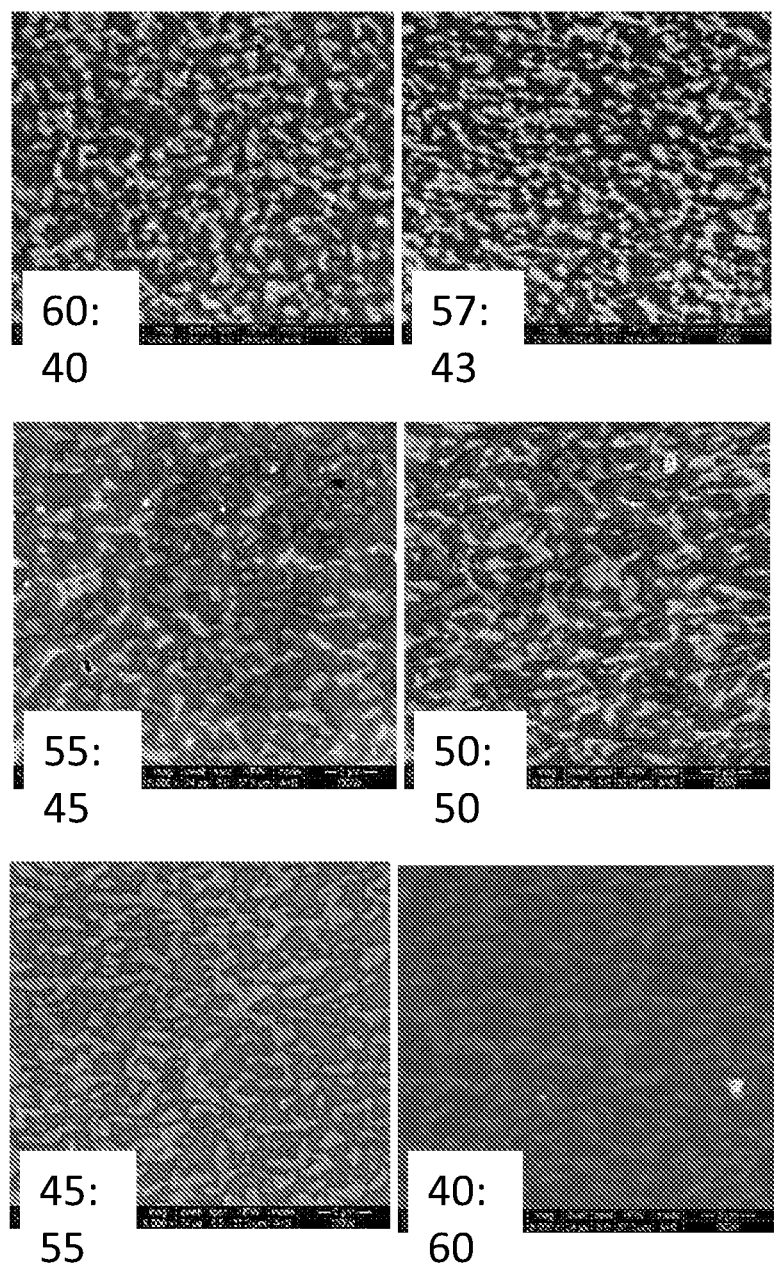
Representative phase separated structure of resin blend in Inventive Example 1-1~6 (pure resin blend without filling carbon black for better observation, bar: 5μm)

SEMICONDUCTIVE SHIELD FREE OF WELD LINES AND PROTRUSIONS

FIELD OF THE INVENTION

This invention relates to power cables. In one aspect the invention relates to power cables comprising semiconductive shields while in another aspect, the invention relates to semiconductive shields that are free of weld lines and protrusions.

BACKGROUND OF THE INVENTION

Medium voltage/high voltage/extra high voltage (MV/HV/EHV) cable construction is typically comprised one or more high potential conductors in a cable core that is surrounded by several layers of polymeric materials including a first semiconducting shield layer, an insulating layer, a second semiconducting shield layer, a metallic wire or tape shield layer used as the ground phase, and a protective jacket. Additional layers within this construction, such as a moisture barrier layer, are often included in the construction.

Polymeric semiconducting shields have been utilized in multilayered power cable construction for many decades. These shields are used to provide layers of intermediate resistivity between the high potential conductor and the primary insulation layer, and between the primary insulation layer and the ground or neutral potential layer.

The primary purpose of the semiconducting shield layer between the conductor and insulation layer within an electrical power cable construction is to ensure the long term viability of the primary solid insulation layer. The use of extruded semiconducting shields essentially eliminates partial discharge within the cable construction at the interface of conductive and dielectric, i.e., insulation, layers. Longer cable life is also realized through improvement of the conductor shield interfacial smoothness, which then minimizes any localized electrical stress concentration. Polymeric conductor shields with improved smoothness have been demonstrated to extend the cable life through accelerated testing (Burns, Eichhorn, and Reid, IEEE Electrical Insulation Magazine, Vol. 8, No. 5, 1992). HV and EHV cable applications require polymeric conductor shields with super smoothness.

Smoothness can be measured using a profilometer. For the assessment of smoothness, a statistical approach of three dimensional structures of protrusions or small lumps of semiconductive shield tapes, which are random in sizes and shapes on the surface, is used. The method determines the number of protrusions and their respective heights in semiconductive shield compounds. The heights are classified into 10 micron (μm) increments from 20-70 μm and the number of protrusions is reported as density (defects/m$^2$). A super smooth semiconductive shield compound typically meets a specification of a maximum (max) of 200 pips/m$^2$ with 30–39 μm size; max of 20 pips/m$^2$ with 40–49 μm size; max 2 pips/m$^2$ with 50–59 μm; without pip size greater than (>) 60 μm.

One common means to achieve a smooth or super smooth interface between the semiconducting shield layer and the conductor or an insulation layer is to include acetylene carbon black in the formulation for the semiconducting shield layer. Due to the chemical and physical nature of acetylene carbon black, relative to furnace carbon black, fewer surface defects are observed on an extruded surface.

Besides carbon black selection, the process by which the semiconducting shield layer is formed also plays important role on smoothness control. The semiconductive layers are usually extruded together with the insulation layer through a triple extrusion system. Weld lines at the interface of two semiconducting shield melts can happen during a co-extrusion process and protrusions between the semiconducting shield and the insulation layers can potentially generate at the weld line position. Such protrusions can cause electrical stress concentration under high voltage and thus shorten cable life.

As such, an interest exists in a semiconducting shield composition that meets the electrical resistance and the smoothness requirements of HV and EHV cables and avoids protrusion issues in their manufacture.

SUMMARY OF THE INVENTION

In one embodiment the invention is a composition comprising:
(A) A nonpolar, ethylene-based polymer having a density of greater than (>) 0.90 grams per cubic centimeter (g/cc) and a melt index of >20 grams per 10 minutes (g/10 min) at 190° C./2.16 Kg;
(B) A polar polymer consisting of ethylene and an unsaturated alkyl ester having 4 to 20 carbon atoms;
(C) Acetylene carbon black; and
(D) A curing agent;
with the provisos that (1) the composition has a phase separated structure, and (2) the weight ratio of nonpolar polymer to polar polymer is from 0.25 to 4.

In one embodiment the invention is a semiconductive shield layer in a cable construction, the semiconductive shield layer made from the inventive composition. In one embodiment the invention is a cable comprising at least one inventive semiconductive shield layer.

BRIEF DESCRIPTION OF THE DRAWINGS

The FIGURE is a collection of scanning electron microscope (SEM) images of compressed plaques from inventive examples 1-1 to 1-6 at nonpolar to polar polymer weight ratios from 60:40 to 40:60.

DETAILED DESCRIPTION OF THE PREFERRED EMBODIMENT

Definitions

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

Unless stated to the contrary, implicit from the context, or customary in the art, all parts and percents are based on weight and all test methods are current as of the filing date of this disclosure.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Composition" and like terms mean a mixture or blend of two or more components.

"Monomer" or "comonomer" are used interchangeably, and they mean any compound with a polymerizable moiety which is added to a reactor in order to produce a polymer. In those instances in which a polymer is described as comprising one or more monomers, e.g., a polymer comprising propylene and ethylene, the polymer, of course, comprises units derived from the monomers, e.g., —CH$_2$—CH$_2$—, and not the monomer itself, e.g., CH$_2$=CH$_2$.

"Polymer" and like terms mean a compound prepared by reacting, i.e., polymerizing, monomers, whether of the same or a different type. The monomers form the mer units of the polymer or, in other words, the mer units of the polymer are derived from the monomers. For example, the monomer ethylene forms the mer unit —CH2CH2- in an ethylene-based polymer. The generic term "polymer" includes the term "homopolymer," usually employed to refer to polymers prepared from only one type of monomer, and the term "interpolymer" as defined below. "Polymer" also embraces all forms of interpolymers, e.g., random, block, homogeneous, heterogeneous, etc.

"Interpolymer" and like terms mean a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc. "Interpolymer" includes all forms of interpolymers, e.g., random, block, etc.

"Ethylene-based polymer" and like terms refer to a polymer containing, in polymerized form, a majority weight percent of units derived from ethylene based on the total weight of the polymer. Nonlimiting examples of ethylene-based polymers include low density polyethylene (LDPE), linear low density polyethylene (LLDPE), very low density polyethylene (VLDPE), ultra-low density polyethylene (ULDPE), medium density polyethylene (MDPE), high density polyethylene (HDPE), and the like.

"Polar," "polar polymer" and like terms refer to polymer molecules with a permanent dipole, i.e., the polymer molecule has a positive end and a negative end. In other words, the electrons in a polar molecule are not shared equally among the atoms of the molecule. Examples of polar polymers include ethylene ethyl acrylate (EEA), ethylene-butyl acrylate (EBA) and ethylene-maleic anhydride (EMA). In contrast, "nonpolar," "nonpolar polymer" and like terms refer to polymer molecules that do not have a permanent dipole, i.e., the polymer does not have a positive end and a negative end. The electrons in a nonpolar molecule are essentially equally shared among the atoms of the molecule. Most hydrocarbon polymers, such as the ethylene-alpha-olefin polymers, are nonpolar.

"Phase separated" and like terms mean that the polar and nonpolar polymers of the composition are immiscible with one another and thus form two separate and distinct regions within the composition. The separated phases can be co-continuous or one phase can be continuous and the other phase dispersed. In a double percolation system, the continuous phase is typically the nonpolar polymer with the polar polymer dispersed within it.

"Double percolation", double percolation system" and like terms mean a co-continuous structure in an immiscible polymer blend. For carbon black filled polymer blends, it means a continuous polymer phase filled with a percolated carbon black network, called a double percolation system. Such systems are typically advantaged over single percolation systems due to their lower carbon black loading and lower viscosity. See Penwisa Pisitsak, Rathanawan Magaraphan, and Sadhan C. Jana, *Electrically Conductive Compounds of Polycarbonate, Liquid Crystalline Polymer, and Multiwalled Carbon Nanotubes, Journal of Nanomaterials*; Volume 2012 (2012), Article ID 642080.

"Weld line" and like terms mean the line formed from the meeting of two flow fronts that fail to weld together during a molding or extrusion process. Weld lines are usually considered a visual and/or structural defect in the product of the molding or extrusion process.

"Weld line zone" and like terms mean the area about a weld line characterized by the comingling of the two or more phases that formed the weld line. The weld line zone usually has an obvious visual defect, e.g., a straight line along the surface, which is due to the so-called V-notch, the area in which air that was once residing in the mold is unable to escape the vent during mold filling.

"Protrusion" and like terms mean a defect in the weld line zone in which one phase protrudes into another phase, e.g., the semiconductive shield protrudes into insulation layer in the weld line zone. Protrusions may cause localized electrical stress and induce undesired treeing or electrical degradation in one or both of the layers. Typical sources of protrusions are grit from carbon black, poor dispersion of carbon black, polymer gels, and contamination from the environment.

"Cable" and like terms mean at least one wire or optical fiber within a protective insulation, jacket or sheath. Typically, a cable is two or more wires or optical fibers bound together, typically in a common protective insulation, jacket or sheath. The individual wires or fibers inside the jacket may be bare, covered or insulated. Combination cables may contain both electrical wires and optical fibers. The cable, etc. can be designed for low, medium, high voltage, and extra high voltage applications. Typical cable designs are illustrated in U.S. Pat. Nos. 5,246,783, 6,496,629 and 6,714,707.

Nonpolar Ethylene-Based Polymer

The nonpolar ethylene-based polymers used in the practice of this invention are hydrocarbons and comprise, or consist essentially of, ethylene and a minor proportion of one or more alpha-olefins having 3 to 12 carbon atoms, and preferably 4 to 8 carbon atoms, and, optionally, a diene. Nonlimiting examples of the alpha-olefins are propylene, 1-butene, 1-hexene, 4-methyl-1-pentene, and 1-octene. Nonlimiting examples of optional dienes are isoprene, 1,3-butadiene, 1,5-cyclooctadiene and the like. The alpha-olefin comonomers can be present in the copolymer in amounts of 25 or less wt %, typically from 1 to less than 25 wt %, or from 5 to 20 wt %, based on the weight of the copolymer. The optional diene, if present, is typically present in the copolymer in amounts of 10 or less wt %, typically from 1 to less than 5 wt %, or from 1 to 3 wt %, based on the weight of the copolymer. The remainder of the nonpolar ethylene-based polymer is, of course, ethylene. The ethylene-based polymers include elastomers, flexomers and plastomers.

Examples of the nonpolar ethylene-based polymers that can be used in the practice of this invention include, but are not limited to, high density polyethylene (HDPE); medium density polyethylene (MDPE); low density polyethylene (LDPE); very low density polyethylene (VLDPE); homogeneously branched, linear ethylene/.alpha-olefin copolymers (e.g. TAFMER™ by Mitsui Petrochemicals Company Limited and EXACT™ by DEX-Plastomers); homogeneously branched, substantially linear ethylene/.alpha.-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company). The substantially linear ethylene copolymers are preferred and more fully described in U.S. Pat. Nos. 5,272,236, 5,278,272 and 5,986,028, and the ethylene block copolymers are more fully described in U.S. Pat. Nos. 7,579,408, 7,355,089 7,524,911, 7,514,517, 7,582,716 and 7,504,347.

The nonpolar ethylene-based polymers used in the practice of this invention have a density of greater than (>) 0.90 g/cc, or from >0.90 to 0.96 g/cc, or from >0.90 to 0.95 g/cc, or from >0.90_ to 0.93 g/cc. Samples for density measurement are prepared according to ASTM D1928. Samples are pressed at 190° C. and 30,000 psi (207 MPa) for 3 minutes, and then at 21° C. and 207 MPa for 1 minute. Measurements are made within 1 hour of sample pressing using ASTM D792, Method B.

The nonpolar ethylene-based polymers used in the practice of this invention have a melt index (MI, I2) of greater than (>) 20 g/10 min, or from >20 to 55 g/10 min, or from >20 to 35 g/10 min, or from >20 to 30 g/10 min. Melt index (grams/10 minutes) is measured in accordance with ASTM D 1238, Condition 190° C./2.16 kg.

In one embodiment the nonpolar ethylene-based polymers used in the practice of this invention also have a melting point of greater than (>) 90° C., or from >90° C. to 115° C., or from >90° C. to 112° C., or from >90° C. to 110° C. Melting point is typically measured by the differential scanning calorimetry (DSC) technique for measuring the melting peaks of polyolefins as described in U.S. Pat. No. 5,783,638. Blends comprising two or more polyolefins will have more than one melting peak; individual polyolefins will typically comprise only one melting peak. The melting point is in degrees Celsius (° C.).

In one embodiment the nonpolar ethylene-based polymers used in the practice of this invention also have a crystallinity of greater than (>) 30%, or from >30 to 60%, or from >30 to 50%, or from >30 to 40%. Crystallinity refers to a polymer that possesses a first order transition or crystalline melting point (Tm) as determined by DSC or equivalent technique.

The nonpolar ethylene-based polymer is present in the composition of this invention in an amount from greater than (≥) 40, or 45, or 50 wt % to less than (<) 100, or less than or equal to (≥) 90, or 80 wt %. In one embodiment the nonpolar ethylene-based polymer is present in the composition in an amount from ≥40 to <100 wt %, or from ≥40 to 90 wt %, or from 50 to 80 wt %.

In one embodiment the nonpolar ethylene-based polymer comprises two or more nonpolar ethylene-based polymers.
Polar Polymer of Ethylene and Unsaturated Alkyl Ester The polar polymer consists essentially of ethylene and an unsaturated alkyl ester. The copolymers of ethylene and unsaturated alkyl esters are generally made by high pressure processes. *Introduction to Polymer Chemistry*, Stille, Wiley and Sons, New York, 1962, pages 149 to 151, describes a conventional high pressure process. The high pressure processes are typically free radical initiated polymerizations conducted in a tubular reactor or a stirred autoclave. In the stirred autoclave, the pressure is typically in the range of 10,000 to 30,000 psi (68.95 to 206.8 megaPascals (MPa)) and the temperature is typically in the range of 175 to 250° C., and in the tubular reactor, the pressure is typically in the range of 25,000 to 45,000 psi (172.4 to 310.3 MPa) and the temperature is in the range of 200 to 350° C.

The unsaturated esters can be alkyl acrylates, alkyl methacrylates, and vinyl carboxylates. The alkyl group can have 1 to 8 carbon atoms and preferably has 1 to 4 carbon atoms. The carboxylate group can have 2 to 8 carbon atoms and preferably has 2 to 5 carbon atoms. In semiconducting shields, the portion of the copolymer attributed to the ester comonomer can be in the range of 20 to 55 wt % based on the weight of the copolymer, and is preferably in the range of 35 to 55 wt %. In terms of mole percent, the ester comonomer can be present in an amount of 5 to 30 mole percent. The ester can have 4 to 20 carbon atoms, and preferably has 4 to 7 carbon atoms.

Examples of vinyl esters (or carboxylates) are vinyl acetate, vinyl butyrate, vinyl pivalate, vinyl neononanoate, vinyl neodecanoate, and vinyl 2-ethylhexanoate. Vinyl acetate is preferred. Examples of acrylic and methacrylic acid esters are lauryl methacrylate; myristyl methacrylate; palmityl methacrylate; stearyl methacrylate; 3-methacryloxy-propyltrimethoxysilane; 3-methacryloxypropyltriethoxysilane; cyclohexyl methacrylate; n-hexylmethacrylate; isodecyl methacrylate; 2-methoxyethyl methacrylate; tetrahydrofurfuryl methacrylate; octyl methacrylate; 2-phenoxyethyl methacrylate; isobornyl methacrylate; isooctylmethacrylate; octyl methacrylate; isooctyl methacrylate; oleyl methacrylate; ethyl acrylate; methyl acrylate; t-butyl acrylate; n-butyl acrylate; and 2-ethylhexyl acrylate. Methyl acrylate, ethyl acrylate, and n- or t-butyl acrylate are preferred. The alkyl group can be substituted with an oxyalkyltrialkoxysilane, for example.

The polar polymer is present in the composition of this invention in an amount from greater than zero, or 1, or 10, or 20, or 30, or 40 wt % to less than or equal to (≤) 60, or 50, wt %. In one embodiment the polar polymer is present in the composition in an amount from greater than zero to 60 wt %, or from 1 to 60 wt %, or from 20 to 60 wt %, or from 40 to 60 wt %, or from 40 to 50 wt %.

The polar copolymers can have a density in the range of 0.900 to 0.990 g/cc, or in the range of 0.920 to 0.970 g/cc. Samples for density measurement are prepared according to ASTM D1928. Samples are pressed at 190° C. and 30,000 psi (207 MPa) for 3 minutes, and then at 21° C. and 207 MPa for 1 minute. Measurements are made within 1 hour of sample pressing using ASTM D792, Method B. The copolymers can also have a melt index in the range of 0.1 to 100 g/10 min, or in the range of 1 to 50 g/10 min. Melt index (grams/10 minutes) is measured in accordance with ASTM D 1238, Condition 190° C./2.16 kg. U.S. Pat. No. 3,334,081 describes a typical process for the preparation of a copolymer of ethylene and an unsaturated ester.

In one embodiment the polar polymer comprises two or more polar polymers.
Acetylene Carbon Black The acetylene carbon black used in the practice of this invention is formed by an exothermic decomposition of acetylene. In one embodiment it has a DBP (diphenyl phthalate) absorption value of 150 to 200 milliliters per 100 grams (ml/100 g), more typically 160 to 190 ml/100 g, and even more typically 165 to 185 ml/100 g (measured according to ASTM D2414-09a, Standard Test Method for Carbon Black-Oil Absorption Number (OAN)). In one embodiment the acetylene carbon black typically has an apparent density range between 0.2 and 0.4 grams per milliliter (g/ml), more typically between 0.25 and 0.4 g/ml, and even more typically between 0.28 and 0.36 g/ml (measured according to ASTM D1513-05e1, Standard Test Method for Carbon Black, Pelleted-Pour Density). In one embodiment the acetylene carbon black typically has an iodine absorption range between 85 and 105 milligrams per gram (mg/g), more typically between 90 to 100 mg/g, and even more typically between 92 to 96 mg/g (measured according to ASTM D1510-09b, Standard Test Method for Carbon Black-Iodine Absorption Number). The acetylene carbon black is typically present in an amount from 30 to 38 wt %, or 30 to 36 wt %, or 30 to 34 wt % based on the weight of the composition.

Cure Agent

The compositions of this invention can be crosslinked. This is accomplished in a conventional manner with a cure agent, typically an organic peroxide or irradiation, the former being preferred. The amount of organic peroxide used is typically in the range of 0.1 to 2.0 wt %. or 0.5 to 2.0 wt %, or 0.5 to 1 wt %, based on the weight of the composite. Organic peroxide crosslinking temperatures are typically in the range of 125 to 250° C., more typically in the range of 135 to 210° C.

Nonlimiting examples of organic peroxides useful in crosslinking are dicumyl peroxide; t-butyl cumyl peroxide; lauroyl peroxide; benzoyl peroxide; tertiary butyl perbenzoate; di(tertiary-butyl) peroxide; cumene hydroperoxide; 2,5-dimethyl-2,5-di(t-butyl-peroxy)hexyne-3; 2,5-dimethyl-2,5-di(t-butyl-peroxy)hexane; tertiary butyl hydroperoxide; isopropyl percarbonate; and alpha,alpha'-bis(tertiary-butylperoxy)diisopropylbenzene.

Irradiation is typically effected by electron beam. The composition in pellet form is subjected to an electron beam at a given dose rate or exposed to a gamma source of specific strength for a given period of time to impart a specific dose rate of radiation, all of which is well known to those of ordinary skill in the art.

Optional Additives

Conventional additives, which can be introduced into the composition, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extender oils, metal deactivators, voltage stabilizers, flame retardant fillers and additives, crosslinking agents, boosters, and catalysts, and smoke suppressants. Additives and fillers can be added in amounts ranging from greater than zero, typically from 0.1, to 50 percent or more by weight (the larger amounts are generally for fillers) based on the weight of the composition.

Examples of antioxidants are: hindered phenols such as tetrakis[methylene(3,5-di-tert-butyl-4-hydroxyhydrocinnamate)]methane; bis[(beta-(3,5-ditert-butyl-4-hydroxy-benzyl)-methylcarboxyethyl)]sulphide; 4,4'-thiobis(2-methyl-6-tert-butylphenol); 4,4'-thiobis(2-tert-butyl-5-methylphenol); 2,2'-thiobis(4-methyl-6-tert-butylphenol); and thiodiethylene bis(3,5-di-tert-butyl-4-hydroxy)hydrocinnamate; phosphites and phosphorites such as tris(2,4-di-tert-butylphenyl)phosphite and di-tert-butylphenyl-phosphonite; thio compounds such as dilaurylthiodipropionate, dimyristylthiodipropionate, and distearyl-thiodipropionate; various siloxanes; and various amines such as polymerized 2,2,4-trimethyl-1,2-dihydroquinoline; 4,4'-bis(alpha,alpha-dimethylbenzyl)diphenylamine, and alkylated diphenylamines. Antioxidants are typically used in amounts of 0.1 to 5 percent by weight based on the weight of the composition.

Composition

The compositions of this invention have a phase separated structure, i.e., the nonpolar and polar polymers are not miscible with one another and as such, exist primarily separate from one another within the composition. Typically, the nonpolar ethylene-based polymer is the continuous phase, and the polar polymer the dispersed phase although in one embodiment, the nonpolar and polymer polymers exist in co-continuous phases. The acetylene carbon black typically and preferentially is in the nonpolar continuous phase.

In one embodiment, the phase separate structure of the composition is a double percolation structure. Immiscible polymer blend systems have been effectively used in the production of electrically conductive composites via preferential localization of the conductive fillers, for example, carbon blacks, in one of the phases. This gives rise to double percolation-in which electrically conductive percolation networks develop in one of the continuous phases. This phenomenon is typically observed in blends with close to 50:50 weight ratios of the component polymers.

The nonpolar and polar polymers of the invention are present in the composition at a weight ratio of 0.25 to 4, or from 0.67 to 1.5, based on the combined weight of the polymers.

Compounding and Semiconducting Shield Fabrication

Compounding can be effected in a conventional melt/mixer or in a conventional extruder, preferably in one step, and the terms melt/mixer and extruder are used in this specification interchangeably. Generally, the conductive shield composition is prepared in a melt/mixer and then pelletized using a pelletizer attachment or an extruder adapted for pelletizing. Both the melt/mixer, as the name implies, and the extruder, in effect, have melting and mixing zones although the various sections of each are known to those skilled in the art by different names.

The semiconducting shield composition of the invention can be prepared in various types of melt/mixers and extruders such as a BRABENDER™ mixer, BANBURY™ mixer, a roll mill, a BUSS™ co-kneader, a biaxial screw kneading extruder, and single or twin screw extruders. One embodiment of a conventional extruder is described in U.S. Pat. No. 4,857,600. In addition to melt/mixing, the extruder can coat a wire or a core of wires. U.S. Pat. No. 5,575,965 provides an example of a co-extrusion and an extruder.

The typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of 15:1 to 30:1. In wire coating, where the material is crosslinked after extrusion, the die of the crosshead feeds directly into a heating zone, and this zone is typically maintained at a temperature in the range of 120° C. to 260° C., more typically in the range of 140° C. to 220° C.

The extrudate is then crosslinked by exposing it to a temperature greater than the decomposition temperature of the cure agent, e.g., organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valves maintain equilibrium of the steam and water and the respective fill lengths within the steam CV tube. Alternatively, a hot nitrogen gas CV tube may be used to cure the cable construction.

The following examples are nonlimiting embodiments of the compositions, semiconducting shield and cables of this invention.

Specific Embodiments

Materials

The materials used in the following examples are described in Table 1.

Acetylene carbon black with a DBP of 200 ml/100 g (ASTM D2414), apparent density of 1.75 g/cm$^3$ and iodine absorption value of 85~93 mg/g (ASTM D1510).

Compounding and Tests Methods and Results

HAAKE™ rheometer mixer is used for compounding all the formulations. Generally, the base resin is added first and melted at 125° C., then carbon black and the other components are added and mixed for 10 minutes at 60 revolutions per minute (rpm).

Tan delta and viscosity are measured using oscillatory rheology on a TA Instruments ARES-G2 rheometer equipped with the 25 mm stainless parallel plates geometry (gap=1.5 mm). Prior to the tests, the specimens are sandwiched between the parallel plates and the auto-tension is activated in compression mode to ensure a good contact with the plates, then the test is started.

Tan delta method was developed to study the visco-elastic properties of compounds and it shows good correlation with the weld line performance of several commercial super smooth products. The dissipation of material is relevant to its elastic property, but in the context of this invention, it more relates to the behavior of the two flow fronts at the interface: how the polymer chains dissipates the energy during deformation and penetrates into each other at the interface of the two flow fronts, and what influences the dispersion of carbon black particles. The dissipation property can be measured with the dissipation factor tan (delta), and the loss modulus by rotational rheometer.

Tan delta/viscosity (at 10 rad/s) is defined as a new parameter to predict the weld line performance. This value is correlated with both the viscoelastity nature of base resin and also the flowability of the compounds. If the Tan delta/viscosity (at 10 rad/s) is higher than 3.6, it predicts the test sample is weld line free. This is confirmed as correct by several commercial products. One can also just use the apparent viscosity at 10 rad/s of the compounds as an indicator, with samples having an apparent viscosity of lower than 3000 mPa·s believed to be weld line free.

TABLE 1

Materials of the Examples

| | | | Basic properties of non-polar resins | | | | | |
|---|---|---|---|---|---|---|---|---|
| Base resin | Functionality | Supplier | MI/190° C./ 2.16 kg | Density/g/ cm$^3$ | Melting point/° C. | Crystallinity/ % | Tensile elongation at break/% | Ultimate Tensile Strength/ MPa |
| Engage 8137 | non-polar resin | Dow Chemical Company | 13 | 0.86 | 56 | 13 | 800 | 2 |
| Infuse 9807 | non-polar resin | Dow Chemical Company | 15 | 0.87 | 118 | — | 1200 | 1.2 |
| Engage 8411 | non-polar resin | Dow Chemical Company | 18 | 0.87 | 76 | 24 | 1000 | 12.9 |
| Engage 8407 | non-polar resin | Dow Chemical Company | 21 | 0.87 | 60 | 21 | 1000 | 3.3 |
| Engage 8401 | non-polar resin | Dow Chemical Company | 30 | 0.89 | 78 | 25 | 950 | 6.4 |
| LDPE 621i | non-polar resin | Dow Chemical Company | 2.3 | 0.92 | 107 | 40~60 | 620 | 19.7 |
| Engage 8402 | non-polar resin | Dow Chemical Company | 30 | 0.90 | 96 | 34 | 910 | 12.9 |
| LDPE 780E | non-polar resin | Dow Chemical Company | 20 | 0.92 | 110 | 40~60 | 700 | 10.5 |
| LDPE 993i | non-polar resin | Dow Chemical Company | 25 | 0.92 | 110 | 40~60 | 40 | 11.7 |
| LDPE 955i | non-polar resin | Dow Chemical Company | 35 | 0.92 | 112 | 40~60 | 90 | 6.9 |
| LDPE 959S | non-polar resin | Dow Chemical Company | 55 | 0.92 | 110 | 40~60 | 58 | 6.2 |
| DXM205 | polar resin | Dow Chemical Company | 21 | 0.93 | 95 | 20 | 750 | 9.7 |
| Acetylene Black | conductive filler | Denka | | | | NA | | |
| Agerite MA/ Naugard UltraQ | anti-oxidant | DuPont | | | | | | |
| VulCup R/ Perkadox | cross-linking agent | Arkema | | | | | | |

Volume resistance (VR) test is according to ASTM D257, IEC 60093.

Scanning Electron Microscope (SEM) is tested on the compressed plaque with accelerated electron 5.00 KV.

Table 2 reports the results of inventive and comparative samples.

TABLE 2

Inventive and Comparative Sample Results

| | Component | Weld line prediction | | | VR (ohm · cm) | |
| --- | --- | --- | --- | --- | --- | --- |
| | (non-polar resin/polar resin) | Tan delta | viscosity at 10 rad/s | Tan delta/ viscosity | 25° C. | 90° C. |
| Control Ex. 1 | Engage 8137/DXM 205 (53:47) | 1.18 | 3718 | 3.17 | 45 | 352 |
| Control Ex. 2 | Infuse 9807/DXM 205 (53:47) | 1.23 | 3505 | 3.50 | 109 | 398 |
| Control Ex. 3 | Engage 8411/DXM 205 (53:47) | 1.10 | 3372 | 3.26 | 24 | 70 |
| Control Ex. 4 | Engage 8407/DXM 205 (53:47) | 1.13 | 3192 | 3.50 | 31 | 265 |
| Control Ex. 5 | Engage 8401/DXM 205 (53:47) | 1.14 | 3724 | 3.06 | 28 | 519 |
| Control Ex. 6 | LDPE 621i/DXM 205 (53:47) | 0.90 | 3639 | 2.47 | 21 | 89 |
| Inventive Ex. 1-1 | Engage 8402/DXM 205 (60:40) | 1.07 | 2450 | 4.37 | 18 | 73 |
| Inventive Ex. 1-2 | Engage 8402/DXM 205 (53:47) | 1.10 | 2558 | 4.30 | 17 | 75 |
| Inventive Ex. 1-3 | Engage 8402/DXM 205 (55:45) | 1.05 | 2532 | 4.14 | 13 | 65 |
| Inventive Ex. 1-4 | Engage 8402/DXM 205 (50:50) | 1.06 | 2612 | 4.05 | 18 | 71 |
| Inventive Ex. 1-5 | Engage 8402/DXM 205 (45:55) | 1.07 | 2700 | 3.96 | 20 | 85 |
| Inventive Ex. 1-6 | Engage 8402/DXM 205 (40:60) | 1.08 | 2875 | 3.75 | 22 | 88 |
| Inventive Ex. 2 | LDPE 780E/DXM 205 (53:47) | 1.09 | 2774 | 3.93 | 15 | 55 |
| Inventive Ex. 3 | LDPE 993i/DXM 205 (53:47) | 1.03 | 2437 | 4.23 | NA | NA |
| Inventive Ex. 4 | LDPE 955i/DXM 205 (53:47) | 1.18 | 2840 | 4.15 | NA | NA |
| Inventive Ex. 5 | LDPE 959S/DXM 205 (53:47) | 1.10 | 2230 | 4.93 | NA | NA |

For the blends, the nonpolar resin part plays a key role on the weld line performance. Table 2 reports that if a nonpolar resin has a MI lower than 20 g/10 min (2.16 kg@190° C.) (Comparative Examples 1, 2, 3 and 6) or a density lower than 0.90 g/cc (Comparative Examples 4 and 5), the blend can have a viscosity at 10 rad/s higher than 3000 mPa·s and the Tan delta/viscosity at 10 rad/s higher than 3.5 which means a weld line issue. Otherwise, if the nonpolar resin has a MI greater than 20 g/10 min (2.16 kg@190° C.) and a density greater than 0.90 g/cc (Inventive examples 1, 2, 3, 4 and 5), the blends can be weld line free.

Preferably the non-polar resin has a melting point higher than 90° C. and a comonomer content <25% and a crystallinity >30% (Inventive example 1). Such a nonpolar resin can be blended with a polar resin, like EEA or EBA or EMA, to form a double percolation phase structure which can be more effective at lowering the carbon black loading while maintaining weld line free performance. Different ratios between polar resin and nonpolar resin are explored from 40:60 to 60:40 (Inventive Examples 1-1 to 1-6). Their phase separated structures are shown in FIG. 1. Higher nonpolar resin content benefits weld line performance due to lower viscosity, however, if the ratio of nonpolar resin to polar resin is greater than 60:40, then attention must also be given to smoothness. For ratios lower than 40:60, weld line issues can be present (tan delta/viscosity lower than 3.5).

The invention claimed is:

1. A composition comprising:
   (A) from 40-90 wt % of a single non-polar ethylene-based polymer, the single non-polar ethylene-based polymer is a linear ethylene-based polymer having a density of greater than (>) 0.90 g/cc and a melt index of >20 g/10 min at 190° C./2.16 Kg;
   (B) from 1-60 wt % of a polar polymer consisting of ethylene and an unsaturated alkyl ester having 4 to 20 carbon atoms;
   (C) from 30-38 wt % of acetylene carbon black; and
   (D) from 0.1-2.0 wt % of a curing agent;

with the provisos that (1) the composition has a phase separated structure, and (2) the weight ratio of nonpolar polymer to polar polymer is from 0.25 to 4.

2. The composition of claim 1 in which the ethylene-based polymer has at least one of (i) a melting point greater than or equal to (≥) 90° C., and (ii) a crystallinity ≥30%.

3. The composition of claim 1 in which the ethylene-based polymer comprises an alpha-olefin of 3 to 12 carbon atoms and, optionally, a diene.

4. The composition of claim 3 in which the ethylene-based polymer comprises less than (<) 25 wt % of mer units derived from the alpha-olefin.

5. The composition of claim 1 in which the polar polymer is at least one of ethylene-ethyl acrylate (EEA), ethylene-butyl acrylate (EBA), or ethylene-maleic anhydride (EMA).

6. The composition of claim 1 in which the phase separated structure is a double percolation phase structure.

7. A semiconductive shield layer made from the composition of claim 1.

8. A cable comprising the semiconductive shield layer of claim 7.

9. The composition of claim 1 wherein the composition has an apparent viscosity at 10 radians per second (rad/s) of less than 3000 milliPascal-seconds (mPa-s).

10. The composition of claim 1 wherein the weight ratio of the nonpolar, linear ethylene-based polymer to polar polymer is 60:40.

11. The composition of claim 1 wherein the weight ratio of the nonpolar, linear ethylene-based polymer to polar polymer is 53:47.

12. The composition of claim 1 wherein the weight ratio of the nonpolar, linear ethylene-based polymer to polar polymer is 55:45.

13. The composition of claim 1 wherein the weight ratio of the nonpolar, linear ethylene-based polymer to polar polymer is 50:50.

14. The composition of claim 1 wherein the weight ratio of the nonpolar, linear ethylene-based polymer to polar polymer is 45:55.

15. The composition of claim 1 wherein the weight ratio of the nonpolar, linear ethylene-based polymer to polar polymer is 40:60.

* * * * *